May 31, 1949. J. H. BAKER 2,471,808
COLLECTOR RING ASSEMBLY
Filed Jan. 30, 1946
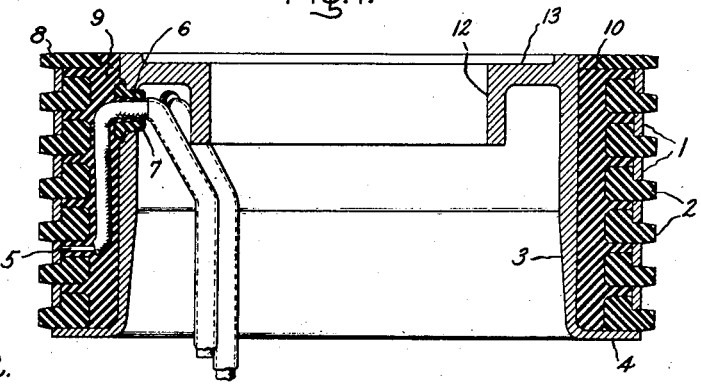
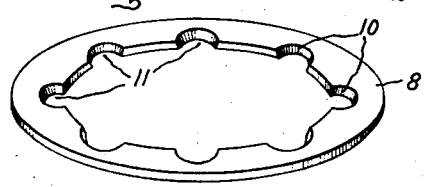
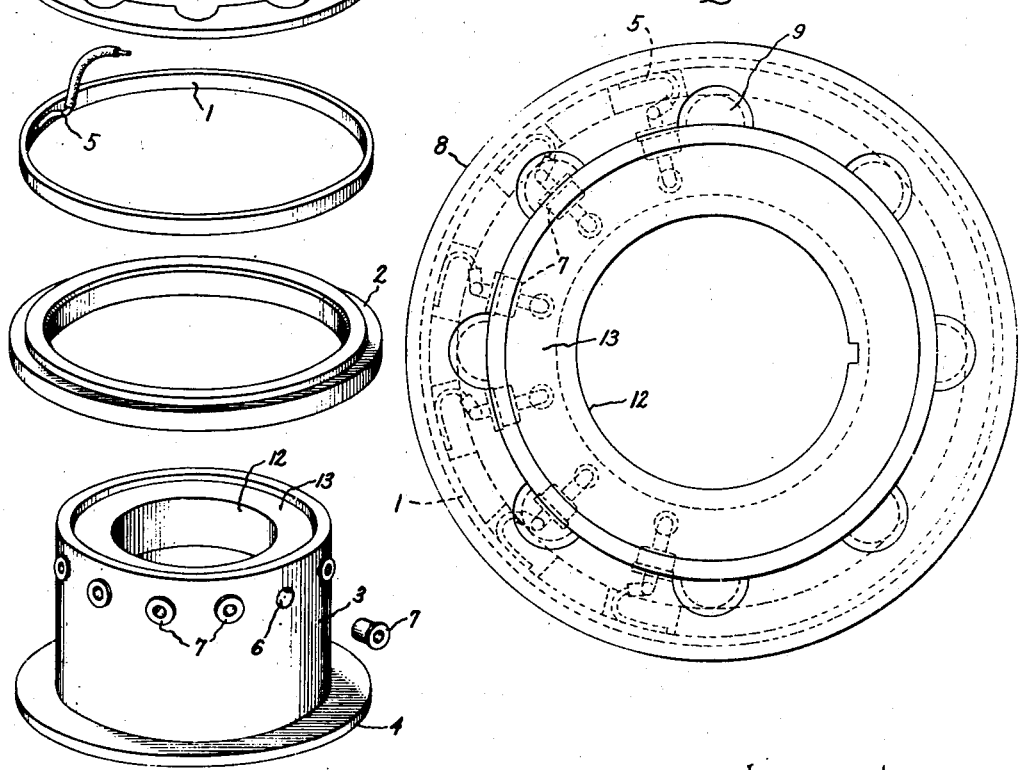
Inventor:
John H. Baker,
His Attorney.

Patented May 31, 1949

2,471,808

UNITED STATES PATENT OFFICE 2,471,808

COLLECTOR RING ASSEMBLY

John H. Baker, Schenectady, N. Y., assignor to General Electric Company, a corporation of New York Application January 30, 1946, Serial No. 644,277

6 Claims. (Cl. 171—322)

My invention relates to collector ring constructions such as are adapted to be particularly used for current collecting purposes on dynamoelectric machines.

An object of my invention is to provide an improved and simplified current collector ring assembly.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional elevational view illustrating an embodiment of my improved current collector ring assembly construction; Fig. 2 is an exploded view of the principal prefabricated parts of the current collector assembly shown in Fig. 1; and Fig. 3 is a plan view of the current collector shown in Fig. 1.

Referring to the drawing, I have shown an embodiment of my improved current collector comprising a plurality of an axially spaced substantially cylindrical electrically conductive collector rings 1 which are arranged intermediate a plurality of substantially L-shaped barrier ring members 2 of insulating material formed with a portion extending between adjacent collector rings and each formed with a shoulder extending axially in supporting engagement with the inner side of one of the adjacent collector rings. This assembly of collector and barrier rings is arranged over a mounting member formed with a substantially cylindrical portion 3 spaced radially inwardly from the collector and barrier rings and having a lip 4 formed on one end thereof extending radially outwardly in engagement with the outermost barrier ring 2 at one end of the assembly for holding all the rings in position thereon. Each of the collector rings 1 is electrically connected in any suitable manner, as by soldering, to a lead 5, and these leads 5 extend through separate circumferentially spaced openings 6 and insulating bushings 7 arranged in these openings in the mounting member portion 3. In forming the mounting member 3, the number of openings 6 therein are made to correspond to the number of collector rings 1 so as to prevent any unnecessary openings through the cylindrical wall 3 of the mounting member. An end insulating ring 8 is arranged over the outer axial edge of the outermost collector ring 1 opposite the mounting member lip 4 and a suitable insulating material 9 is arranged in the space around the collector rings 1, the barrier rings 2, and the leads 5 between the collector and barrier rings and the mounting member cylindrical portion 3 substantially filling this space and extending over a sloping part 10 of the end insulating ring 8 for holding the entire assembly of collector and barrier rings in position on the mounting member. This insulating material 9 may be of any suitable type, such as a moldable heat hardenable insulating material or may comprise a solventless varnish. This insulating material may be poured, molded, or otherwise inserted in the space between the collector rings and the mounting member 3 through openings 11 formed in the outer ring 8 and then may be suitably cured by the application of heat, after which a fungicidal varnish may be applied to the exposed surfaces of the barrier rings 2. This type collector has the advantage of being resistant to thermal shock, moisture, and aircraft vibrations, and, in addition, eliminates the necessity of through bolts or other devices for binding the parts axially together and eliminates the necessity for a precise machining of the outer diameter of the collector rings, as these may be preformed to the desired dimension. Furthermore, the mounting member may be formed with a mounting hub 12 which extends axially within the cylindrical portion 3 and is secured thereto by any suitable web 13 and provides for an easily machined inner diameter for the mounting member of the collector assembly. Another advantageous feature of this arrangement is that the inner diameters of the barrier rings 2 need not be made to any precise dimension, as the insulating material 9 which fills the space around the inner sides of these barrier rings eliminates the requirements for an accurate dimension at this point.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A current collector comprising an assembly of a plurality of axially spaced electrically conductive collector rings with a substantially L-shaped barrier ring member of insulating material arranged between adjacent rings of said collector rings and having a shoulder portion extending axially in supporting engagement with the inner side of one of said adjacent collector rings, a mounting member having a portion spaced inwardly from said collector and barrier rings with a lip extending radially outwardly in engagement with the outermost of said barrier rings at one end of said assembly, and means including an insulating material substantially filling the space between said collector and barrier rings and said mounting member and extending over a part of said assembly opposite said mounting member lip for holding said assembly in position on said mounting member.

2. A current collector comprising a plurality of axially spaced electrically conductive collector rings, barrier ring members of insulating material arranged between said collector rings and each having a portion extending radially between adjacent collector rings, a mounting member having a portion spaced radially from said collector and barrier rings with circumferentially spaced openings therein corresponding in number to the number of said collector rings, a separate lead electrically connected to each of said collector rings, each of said leads extending through a separate one of said mounting member openings, and means including a heat hardenable insulating material molded in the space around said collector rings and barrier rings around said leads between said collector rings and said mounting member substantially filling said space for holding said collector and barrier rings in position on said mounting member.

3. A current collector comprising a plurality of axially spaced cylindrical electrically conductive collector rings, substantially L-shaped barrier ring members of insulating material arranged alternately between said collector rings and each having a portion extending radially between adjacent collector rings, a mounting member having a portion spaced radially inwardly from said collector rings and barrier rings with circumferentially spaced openings therein corresponding in number to the number of said collector rings, an insulating bushing in each of said mounting member openings, a lead electrically connected to each of said collector rings and each extending through a separate one of said mounting member openings and bushings, and means including a molded heat hardenable insulating material arranged in the space around said collector rings and barrier rings around said leads between said collector rings and said mounting member substantially filling said space for holding said collector and barrier rings in position on said mounting member.

4. A current collector comprising an assembly of a plurality of axially spaced electrically conductive collector rings with a substantially L-shaped barrier ring member of insulating material arranged between adjacent rings of said collector rings and having a shoulder portion extending axially in supporting engagement with the inner side of one of said adjacent collector rings, a mounting member having a portion spaced radially within said collector and barrier rings with circumferentially spaced openings therein corresponding in number to the number of said collector rings and having a lip extending radially outwardly in engagement with the outermost of said barrier rings at one end of said assembly, a separate lead electrically connected to each of said collector rings and extending through a separate one of said mounting member openings, and means including an insulating material substantially filling the space around said collector rings and barrier rings around said leads between said collector rings and said mounting member for holding said collector and barrier rings and leads in position on said mounting member.

5. A current collector comprising an assembly of a plurality of axially spaced electrically conductive collector rings with a substantially L-shaped barrier ring member of insulating material arranged between adjacent rings of said collector rings and having a shoulder portion extending axially in supporting engagement with the inner side of one of said adjacent collector rings, a mounting member having a portion spaced inwardly from said collector and barrier rings with circumferentially spaced openings therein corresponding in number to the number of said collector rings and having a lip extending radially outwardly in engagement with the outermost of said barrier rings at one end of said assembly, a separate lead electrically connected to each of said collector rings and extending through a separate one of said mounting member openings, and means including an insulating material substantially filling the space around said collector and barrier rings around said leads between said collector rings and said mounting member and extending over a part of said assembly opposite said mounting member lip for holding said assembly in position on said mounting member.

6. A current collector comprising an assembly of a plurality of axially spaced electrically conductive collector rings with a substantially L-shaped barrier ring member of insulating material arranged between adjacent rings of said collector rings and having a shoulder portion extending axially in supporting engagement with the inner side of one of said adjacent collector rings, a mounting member having a portion spaced inwardly from said collector and barrier rings with circumferentially spaced openings therein corresponding in number to the number of said collector rings and having a lip extending radially outwardly in engagement with the outermost of said barrier rings at one end of said assembly, a separate lead electrically connected to each of said collector rings and extending through a separate one of said mounting member openings, an end insulating ring over the outer axial edge of the outermost collector ring opposite said mounting member lip, and means including an insulating material substantially filling the space around said collector and barrier rings around said leads between said collector rings and said mounting member and extending over a part of said end insulating ring for holding said assembly in position on said mounting member.

JOHN H. BAKER.

REFERENCES CITED

The following references are of record in the file of this patent:

UNITED STATES PATENTS

| Number | Name | Date |
|---|---|---|
| 390,439 | Bradley | Oct. 2, 1888 |
| 1,511,316 | Bastian | Oct. 14, 1924 |
| 1,870,236 | Chervenka | Aug. 9, 1932 |

FOREIGN PATENTS

| Number | Country | Date |
|---|---|---|
| 381,377 | Germany | Sept. 25, 1923 |